March 16, 1954

B. F. LEWIS

RECORDING SYSTEM 2,672,395

Filed Sept. 18, 1952

2 Sheets-Sheet 1

INVENTOR
B. F. LEWIS
BY
J. W. Schmied
ATTORNEY

INVENTOR
B. F. LEWIS
BY J. W. Schmied
ATTORNEY

Patented Mar. 16, 1954 2,672,395

UNITED STATES PATENT OFFICE 2,672,395

RECORDING SYSTEM

Benjamin F. Lewis, Bayside, N. Y., assignor to Bell Telephone Laboratories, Incorporated, New York, N. Y., a corporation of New York Application September 18, 1952, Serial No. 310,287

8 Claims. (Cl. 346—74)

This invention relates to magnetic recorders and more particularly to magnetic recorders for marking or identifying tapes in automatic processing systems.

Heretofore in the prior art as exemplified by Patent 2,561,476 to W. Y. Lang which issued on July 24, 1951, magnetic means were utilized to identify tickets or tapes for the automatic sorting thereof. The magnetic means, however, as utilized in the prior art provided substantially weak indications over limited areas of the ticket or tape and, moreover, necessitated critical staggered positions of the recording areas, being thus prone to false indications. The present invention overcomes these difficulties existing in the prior art by providing for a recording system having three electromagnetic recording heads which operate in conjunction with a printing wheel. The recording heads have wide pole faces and thus effect an indication or recording upon the tape which covers a relatively large area. The three recording heads are energized in accordance with the two-out-of-three polarized code under control of a two-wheel commutator. The commutator is revolved together with the printing wheel to control the coding of positive and negative pulses to the recording heads. The tickets or tapes are thereafter sorted after passing under three reproducing heads which, together with their associated circuitry, determine the occurrence of signals and their polarities.

It is therefore an object of this invention to provide for a novel sorting system which provides a magnetic indication upon the tape simultaneously with the printing of the corresponding numeral thereon.

Another object of the present invention is the provision of a novel magnetic recording device which provides strong indications over substantially wide areas of the tape.

Still another object of the present invention is the provision of a novel recording device which provides a typed indication and magnetic code indication corresponding thereto, arranged laterally across the tape.

Still another object of the present invention is the provision of a novel magnetic recorder which provides a strong definite indication, reducing the possibility for false indications.

Still another object of the present invention is the provision of a novel automatic method of sorting tapes which provides a visual indication of the numeral and a simple magnetic coded indication corresponding thereto.

Still another object of the present invention is the provision of a novel two-out-of-three polar code for the ten numerals of the decimal system.

Further objects and advantages of the present invention will be apparent to those skilled in the art upon consideration of the following description taken in conjunction with the figures wherein.

Figure 1:
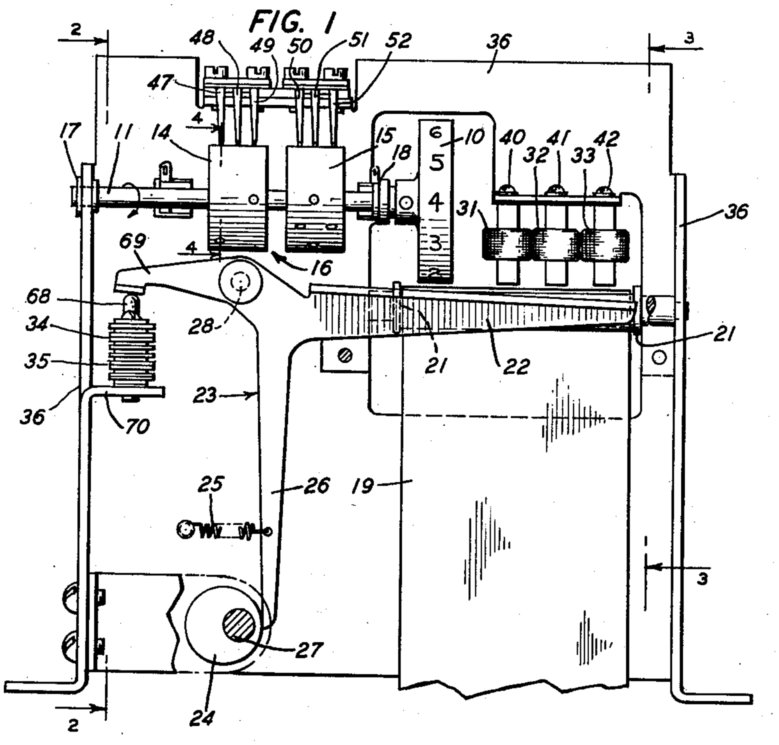
Fig. 1 is a front view of the recording device of the present invention with the printing bar lowered.

Referring to Fig. 1, shaft 11 is rotated by a servomechanism apparatus (not shown), as is well known in the art, through a definite rotation in accordance with intelligence entered to the servomechanism apparatus. The shaft 11, supported in bearings 17 and 18 upon frame 36, supports a printing wheel 10 and the positive and negative wheels 14 and 15 of a commutator 16 hereinafter described in detail in reference to Figs. 4, 5 and 6. The rotation, therefor, of shaft 11 to a definite angular position provides for a corresponding positioning of printing wheel 10 and commutator 16. The printing wheel 10 has the ten numerals 0 through 9 about its periphery and adjacent the tape or ticket 19. The tape 19 is a magnetic tape, as is well known in the art, which when subjected to controlling magnetic fields and removed therefrom, retains suitable or sufficient remanent fluxes therein which are effective in creating current impulses when presented to suitable detecting or sensing devices. The tape 19 passes across the rollers 20 and 21 shown in Fig. 2 beneath and adjacent to the printing wheel 10. The rollers 20 and 21 are supported on a bracket 37 which is, in turn, supported by screws 38 and 39 upon frame 36.

The tape 19 is pressed or forced against a numeral on the positioned printing wheel 10 by a press or printing bar 22 which is part of a cam-actuated member 23. An arm 26 of member 23 is restrained against cam 24 by a restoring spring 25. As cam 24 rotates on shaft 27 the member 23 is caused to oscillate about pivot pin 28 bringing the tape 19 repeatedly against the printing wheel 10, and thus having impressed thereupon one of the numerals. The shaft 27 is supported in bearings 29 and 30 and is driven or rotated by the servomechanism apparatus referred to above but not shown herein. The sequence of events is such as to first position the printing wheel 10 and the tape 19 and thereafter rotate the member 23 in a counter-clockwise direction as seen in Fig. 1 to cause the impression of the printing wheel numeral upon tape 19 and also to provide a magnetic indication corresponding thereto, as is hereinafter described.

The magnetic indication is provided upon the tape 19 by three recording heads 31, 32 and 33 which are supported by screws 40, 41 and 42, respectively, on frame 36 adjacent the tape 19. Combinations of positive and negative pulses are supplied to the recording heads 31, 32 and 33 in accordance with a two-out-of-three polar code, hereinafter described, under control of the commutator 16 and a pair of transfer contacts 34 and 35 also hereinafter described.

Figures 2, 3, 4:
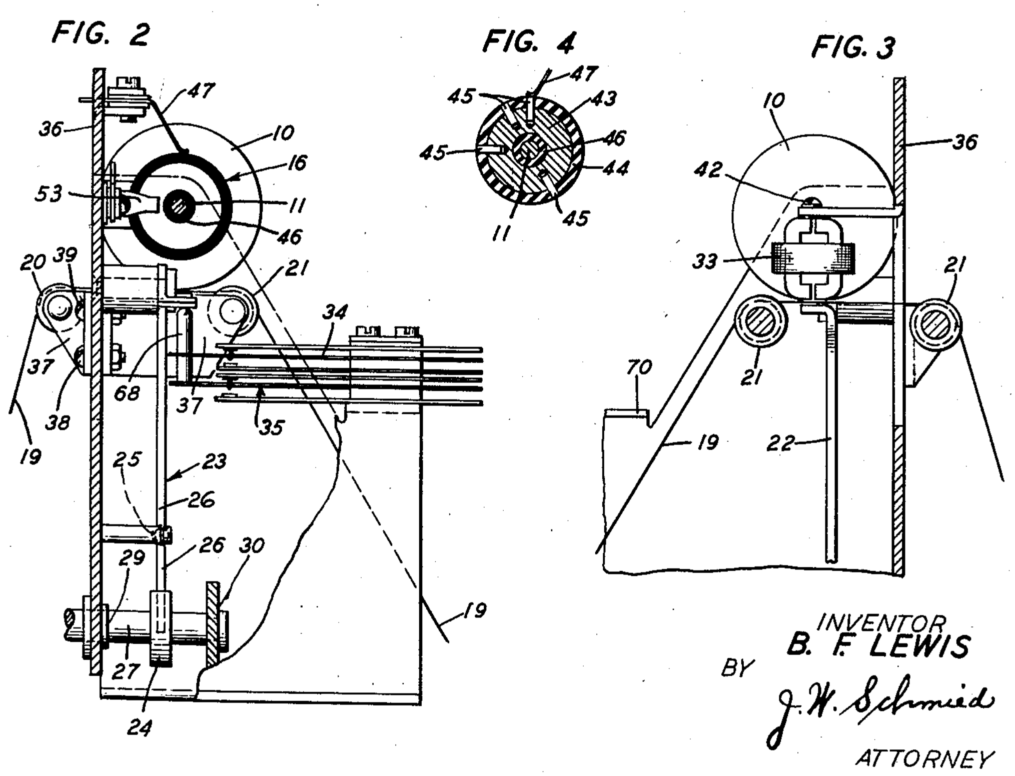
Fig. 2 is a sectionalized view of the recorder of the present invention along line 2—2 in Fig. 1.
Fig. 3 is a sectional view along line 3—3 of Fig. 1.
Fig. 4 is a sectional view of the commutator of the present invention along line 4—4 in Fig. 1.
Figure 5:
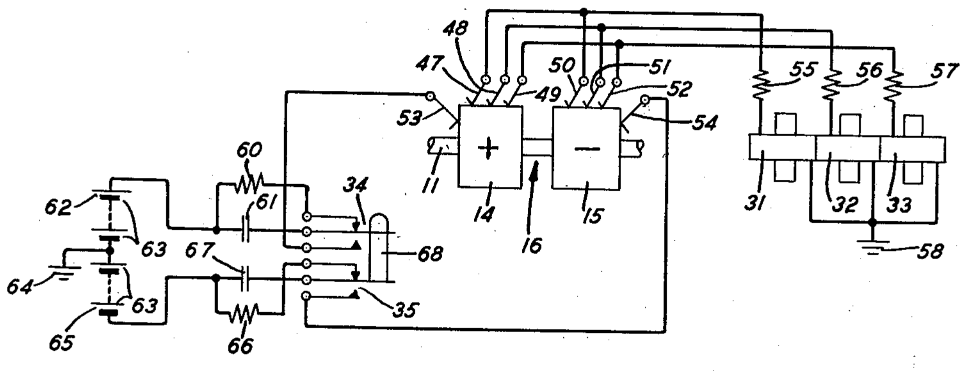
Fig. 5 is a circuit representation of the present invention with the commutator and recording heads diagrammatically represented.
Figure 6:
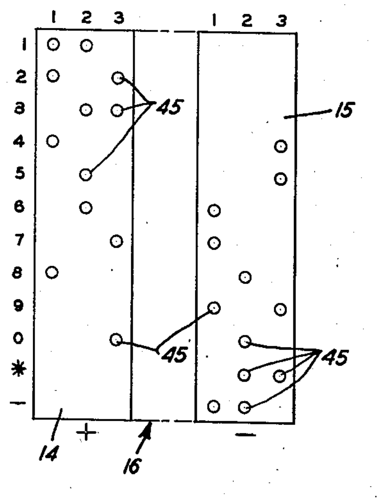
Fig. 6 is a development view of the surface of the commutator of the present invention.

The commutator 16 has, as described above, a positive wheel 14 and a negative wheel 15 shown more specifically in the developed plan view of Fig. 6. Referring to Fig. 4, which is a cross-sectional view through the wheel 14, the commutator wheels 14 and 15 are short brass cylinders 43 covered with a layer of insulating material or sheet 44 and insulated from shaft 11 by bearing 46. The wheels 14 and 15 each comprises a plurality of contact points or pins 45 which are of conductive material and screwed or forced through the insulating shell 44, into the brass cylinder 43. The outer ends of the pins 45 are flush or level with the surface of the insulating shell 44. Commutator 16 is in contact with eight brushes 47 through 54, with the periphery or insulating shell 44 and pins 45 of wheel 14 in contact with brushes 47, 48 and 49, and of wheel 15 in contact with brushes 50, 51 and 52 and with the cylinder 43 of wheel 14 in contact with brush 53 (Figs. 2 and 5), and of wheel 15 in contact with brush 54. Referring now to Fig. 5, the brushes 47, 48 and 49 and the brushes 50, 51 and 52 are connected respectively to the recording heads 31, 32 and 33 through the equivalent resistors 55, 56 and 57. A second connection to each of the recording heads 31, 32 and 33 is from ground at 58. Parallel conductive paths therefore exist from ground at 58, through two of the three recording heads 31, 32 and 33, as is hereinafter described, the two corresponding resistors of resistors 55, 56 and 57, two of the brushes 47 through 52, two of the pins 45 (one in each wheel 14 and 15), the brass cylinders 43 in wheels 14 and 15, brushes 53 and 54 to the transfer contacts 34 and 35.

The coding or selection of paths and polarities is provided in accordance with the code of the pins 45 shown in Fig. 6, and in the following chart:

| | Polarity Code | | |
|---|---|---|---|
| | Head 31 | Head 32 | Head 33 |
| 1 | + | + | |
| 2 | + | | + |
| 3 | | + | + |
| 4 | + | | − |
| 5 | | + | − |
| 6 | − | + | |
| 7 | − | | + |
| 8 | + | − | |
| 9 | − | | − |
| 0 | | − | + |
| * | | − | − |
| — | − | − | |

The recording heads 31, 32 and 33 receive combinations of positive and negative pulses according to the above two-out-of-three code in the above chart and as is hereinafter described. The positive and negative pulses are brought to the wheels 14 and 15 through the transfer contacts 34 and 35. Each of the transfer contacts 34 and 35, supported on angle 70 (Fig. 1), has an upper contact and a lower contact. The upper contact of transfer 34 is connected through resistor 60 to one plate of capacitor 61 and to the positive pole 62 of a plurality of batteries 63. The zero or center connection of the batteries 63 is connected to ground at 64 and the negative pole 65 is connected to resistor 66 and one plate of capacitor 67. The other plate of capacitors 61 and 67 is connected respectively to the center or movable contact of transfer contacts 34 and 35. The movable contacts of transfer contacts 34 and 35 are connected together by contact finger 68 and move therefore in unison. When the movable contacts are unoperated they make contact with the upper contacts causing the capacitors 61 and 67 to be shunted by the resistors 60 and 66. The capacitors 61 and 67 in this condition are discharged.

Figure 7:
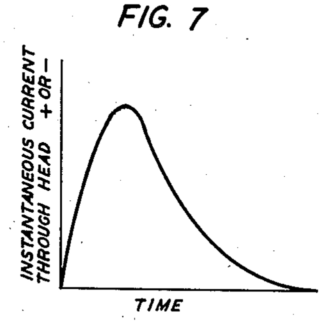
Fig. 7 is a graph of the instantaneous positive or negative current through one of the recording heads of the present invention.

The transfer contacts 34 and 35 are operated when the arm 69 of member 23, described above (Fig. 1), moves the contact finger 68 down at the same time that the printing bar 22 moves the tape 19 against the printing wheel 10. The movement or operation of the movable contacts brings them in contact with the lower contacts of the transfer contacts 34 and 35. As the movable contacts meet the lower contacts, the capacitors 61 and 67 charge through the commutator 16 and recording heads 31, 32 and 33 depending upon the code. One possible path is from ground at 64, a positive pole 62, capacitor 61, movable contact and lower contact of transfer contacts 34, brush 53, commutator wheel 14, one, two or more of the brushes 47, 48 or 49 depending upon the code, the corresponding resistor 55, 56 or 57 and the corresponding recording head 31, 32 or 33 to ground at 58. A second possible path can be completed from ground at 64, to negative pole 65, capacitor 67, movable and lower contact of transfer contacts 35, brush 54, commutator wheel 15, brushes 50, 51 or 52, the corresponding resistor 55, 56 or 57 and the corresponding recording head 31, 32 or 33 to ground at 58. As described above, for each numeral, two of the recording heads are energized. The resistors 55, 56 and 57 and the capacitors 61 and 67 have such values as to provide with the effective inductance and resistance of the heads a critically damped current, positive or negative, as shown in Fig. 7. The critically damped current provides maximum magnetizing effect without undesirable oscillations that might partially erase the magnetic indication on the tape.

Figure 8:
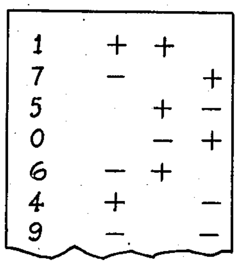
Fig. 8 is a portion of a magnetic tape illustrating the two-out-of-three polar code of the present invention.

Consider, for example, the sequence of events that occurs when a specific number 1750649 is entered to the recorder of the present invention. The number and the coded indications corresponding thereto are shown in Fig. 8.

The servomechanism apparatus (not shown) causes the printing wheel 10 and commutator 16 to rotate so that the numeral 1 is adjacent the tape 19, and simultaneously steps the tape 19 one space. As shown in Figs. 5 and 6, brush 53 will make contact through two pins 45 to the brushes 47 and 48. No path is provided from brush 53 to brush 49 nor from brush 54 to the brushes 50, 51 and 52. With the printing wheel 10 and commutator 16 in position, the rotation of the cam 24 causes the member 23 to oscillate or rotate in a counter-clockwise manner bringing the tape 19 against the printing wheel 10 and adjacent the recording heads 31, 32 and 33, and also operating the transfer contacts 34 and 35. The numeral 1 is impressed upon tape 19 and simultaneously the capacitor 61 discharges through recording heads 31 and 32 providing a positive magnetic indication laterally adjacent the impression of the numeral 1 as shown in Fig. 8. Since the recording heads 31 and 32 have wide faces, indications are provided over substantially large areas. The continued rotation of the cam 24 allows the tape 19 to descend and the capacitor 61 to discharge. The servomechanism apparatus steps the tape 19 and rotates or positions the printing wheel 10 and commutator 16 corresponding to the number or numeral 7. The sequence of operations repeats for the numeral 7 and this time both capacitors 61 and 67 charge; capacitor 61 through recording head 33 and capacitor 67 through recording head 31. In this manner an electromagnetic record is produced at the same time that a printed record is produced.

The use of the three recording heads 31, 32 and 33 arranged laterally across the tape or ticket 19 makes it possible to scan the tape 19 longitudinally and thus avoid alignment errors due to variations in the distances from the ends of the tape 19 to individual rows of the indications. The use of the three electromagnetic recording heads which are energized when the press 22 operates avoids the possibility of falsely marking the magnetic coating of tape 19 as the result of too little spacing between the tape 19 and the recording heads 31, 32 and 33 when the tape 19 is raised for registration.

While there have been shown and described and pointed out the fundamental novel features of the invention as applied to a single modification, it will be understood that various omissions and substitutions and changes in the form and details of the devices illustrated and in its operation may be made by those skilled in the art without departing from the spirit of the invention.

What is claimed is:

1. A magnetic device for recording numerals comprising a printing wheel; a commutator rotatable with said printing wheel; a pair of transfer contacts; a plurality of recording heads controlled by said commutator and said pair of transfer contacts; a magnetic tape; means for positioning said printing wheel and commutator corresponding to a selected numeral; and means for moving said magnetic tape against said printing wheel and said plurality of recording heads and simultaneously actuating said transfer contacts.

2. A recording device comprising a printing wheel; a commutator rotatable with said printing wheel; three recording heads connected to said commutator; a positive and negative source of current; a magnetic tape; actuating apparatus for moving said magnetic tape against said printing wheel and said three recording heads and for simultaneously connecting said source of positive and negative current to said commutator.

3. A magnetic recording device comprising an actuating member having a first, second and a third arm, a cam adjacent said first arm, the rotation thereof causing said actuating member to oscillate; a magnetic tape adjacent said second arm of said actuating member and movable thereby; a pair of transfer contacts adjacent said third arm of said actuating member and operable thereby; a source of current connected to said transfer contacts; a printing wheel having type characters thereon positioned adjacent said magnetic tape; a commutator; and three recording heads positioned adjacent said magnetic tape, the oscillation of said actuating member causing said magnetic tape to be repeatedly brought against said printing wheel and said three recording heads as the operation of said transfer contacts causes the energization of said recording heads by connecting said source thereto through said commutator.

4. A recording device comprising an actuating member having a first, second and a third arm; a cam adjacent said first arm, the rotation thereof causing said actuating member to oscillate; a magnetic tape adjacent said second arm of said actuating member and movable thereby; a pair of transfer contacts adjacent said third arm of said actuating member and operable thereby; a source of current connected to said transfer contacts; a printing wheel having type characters thereon positioned adjacent said magnetic tape; three recording heads positioned adjacent said magnetic tape; and a commutator rotatable with said printing wheel electrically connecting said transfer contacts to two of said three recording heads.

5. A recording device comprising an actuating member having a first, second and a third arm; a cam adjacent said first arm, the rotation thereof causing said actuating member to oscillate; a magnetic tape adjacent said second arm of said actuating member and movable thereby; a pair of transfer contacts adjacent said third arm of said actuating member and operable thereby; a source of current connected to said transfer contacts; a printing wheel having type characters thereon positioned adjacent said magnetic tape; three recording heads positioned adjacent said magnetic tape; and a commutator rotatable with said printing wheel electrically connecting said transfer contacts to two of said three recording heads, the oscillation of said actuating member moving said magnetic tape repeatedly against said printing wheel and said three recording heads and actuating said transfer contacts causing the energization of two of said three recording heads by connecting said source to said commutator.

6. A polar code electromagnetic recording device comprising a source of positive and negative pulses; a rotatable commutator having a positive and a negative wheel; a pair of transfer contacts connecting said positive wheel to said positive source and said negative wheel to said negative source; and three magnetic recording heads connected to said positive and to said negative wheels, the rotation of said commutator changing the connections from said transfer contacts to said three recording heads providing a two-out-of-three polar energization thereby.

7. A polar code electromagnetic recording device comprising a source of positive and negative pulses; a rotatable commutator having a positive and a negative wheel; a pair of transfer contacts connecting said positive wheel to said positive source and said negative wheel to said negative source; a magnetic tape; three magnetic recording heads connected to said positive and to said negative wheels; and means for moving said magnetic tape against said recording heads and actuating said transfer contacts, the rotation of said commutator changing the connections from said transfer contacts to said three recording heads providing a two-out-of-three polar energization thereby on said magnetic tape.

8. A polar code electromagnetic recording device comprising a source of positive and of negative pulses; a rotatable commutator having a positive wheel connectable with said positive pulse source and a negative wheel connectable with said negative pulse source; a magnetic tape; three magnetic recording heads connected to said positive and to said negative wheels; and means for moving said magnetic tape and for connecting said positive and negative pulse sources, respectively to said positive and negative wheels, the rotation of said commutator providing different conductive paths from said positive and negative pulse sources to said three magnetic recording heads providing a two-out-of-three polar magnetic indication upon said magnetic tape.

BENJAMIN F. LEWIS.

References Cited in the file of this patent

UNITED STATES PATENTS

| Number | Name | Date |
|---|---|---|
| 2,006,999 | Machumsohn | July 2, 1935 |
| 2,359,617 | Bryce | Oct. 3, 1944 |
| 2,522,463 | Potts | Sept. 12, 1950 |
| 2,561,476 | Lang | July 24, 1951 |